United States Patent [19]

Seiler

[11] Patent Number: 5,188,382
[45] Date of Patent: Feb. 23, 1993

[54] MOTOR VEHICLE STEERING KNUCKLE

[75] Inventor: Christian Seiler, Villeurbanne, France

[73] Assignee: Renault Vehicules Industriels, Lyons, France

[21] Appl. No.: 610,755

[22] Filed: Nov. 8, 1990

[30] Foreign Application Priority Data

Nov. 10, 1989 [FR] France .................... 89 14768

[51] Int. Cl.⁵ .................................. B62D 7/18
[52] U.S. Cl. .................................. 280/96.1
[58] Field of Search ............ 280/96.1, 93, 95.1; 301/124 R, 124 H

[56] References Cited

U.S. PATENT DOCUMENTS

| 1,384,309 | 7/1921 | Druar | 280/96.1 |
| 1,932,340 | 10/1933 | Goltry | 290/96.1 |
| 2,421,007 | 5/1947 | Buckendale | 280/96.1 |
| 2,637,568 | 5/1953 | Booth et al. | |

FOREIGN PATENT DOCUMENTS

| 571476 | 10/1958 | Belgium . |
| 609891 | 8/1926 | France. |
| 2044698 | 10/1980 | United Kingdom . |
| 81/02999 | 10/1981 | World Int. Prop. O. . |

Primary Examiner—Charles A. Marmor
Assistant Examiner—Paul Dickson
Attorney, Agent, or Firm—Oblon, Spivak, McClelland, Maier & Neustadt

[57] ABSTRACT

A vehicle steering knuckle includes a body, a knuckle shaft for supporting a wheel and extending from the body, and a yoke having upper and lower legs extending from the body in a direction opposite the knuckle shaft. The upper leg of the yoke includes a fastening flange separate from the main body, the fastening flange including a bore through which a pivot pin can pass. Bolts releasably fasten the fastening flange to the body. A head end of an axle can fit between the upper and lower legs and a pivot pin can be inserted through the yoke and the axle to form a knuckle joint. The fastening flange can be released from the body to gain access to a portion of the knuckle joint by releasing the bolts.

5 Claims, 2 Drawing Sheets

MOTOR VEHICLE STEERING KNUCKLE

BACKGROUND OF THE INVENTION

1. Field of the Invention

The invention relates to a motor vehicle steering knuckle having a steel body from which a knuckle shaft extends outward and from which a yoke extends inward, a pivot pin passing through the yoke being locked in a bore on the head end of an axle which fits between the legs of the yoke.

2. Description of the Related Art

This type of knuckle is known from publication FR-A-1,367,624. In the structures of this type, the pin is pressed into the axle head while it is mounted with an operating play in the two legs of the yoke.

Publication FR-A-2,203,342 describes a steering knuckle whose knuckle shaft is mounted in a bore of the knuckle body and a leg of the yoke.

Knuckles of the known type require the removal of the pivot pin prior to gaining access the mechanical components such as rings, bushings and a thrust bearing which provide the pivoting of the knuckle and support the load of the axle. This requires a special tool and a large expenditure of energy.

SUMMARY OF THE INVENTION

The invention has as an object a steering knuckle of simplified design which makes complete overhauling of the knuckle possible without the need to remove the pivot pin.

The invention also has as an object a knuckle that extends the upper and lower legs of a yoke through which the pivot pin passes, to facilitate the removal of the knuckle.

According to the present invention, the above and other objects are accomplished by a vehicle steering knuckle including a body, a knuckle shaft for supporting a wheel and extending from the body, and a yoke having upper and lower legs extending from the body in a direction opposite the knuckle shaft. The upper leg of the yoke includes a fastening flange separate from the main body, the fastening flange including a bore through which a pivot pin can pass. Means are provided for releasably fastening the fastening flange to the body. A head end of an axle can fit between the upper and lower legs and a pivot pin can be inserted through the yoke and the axle to form a knuckle joint. The fastening flange may be released from the body to gain access to a portion of the knuckle joint.

The knuckle thus made can easily be separated from the axle and can be overhauled and inspected without requiring special tools or skills.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
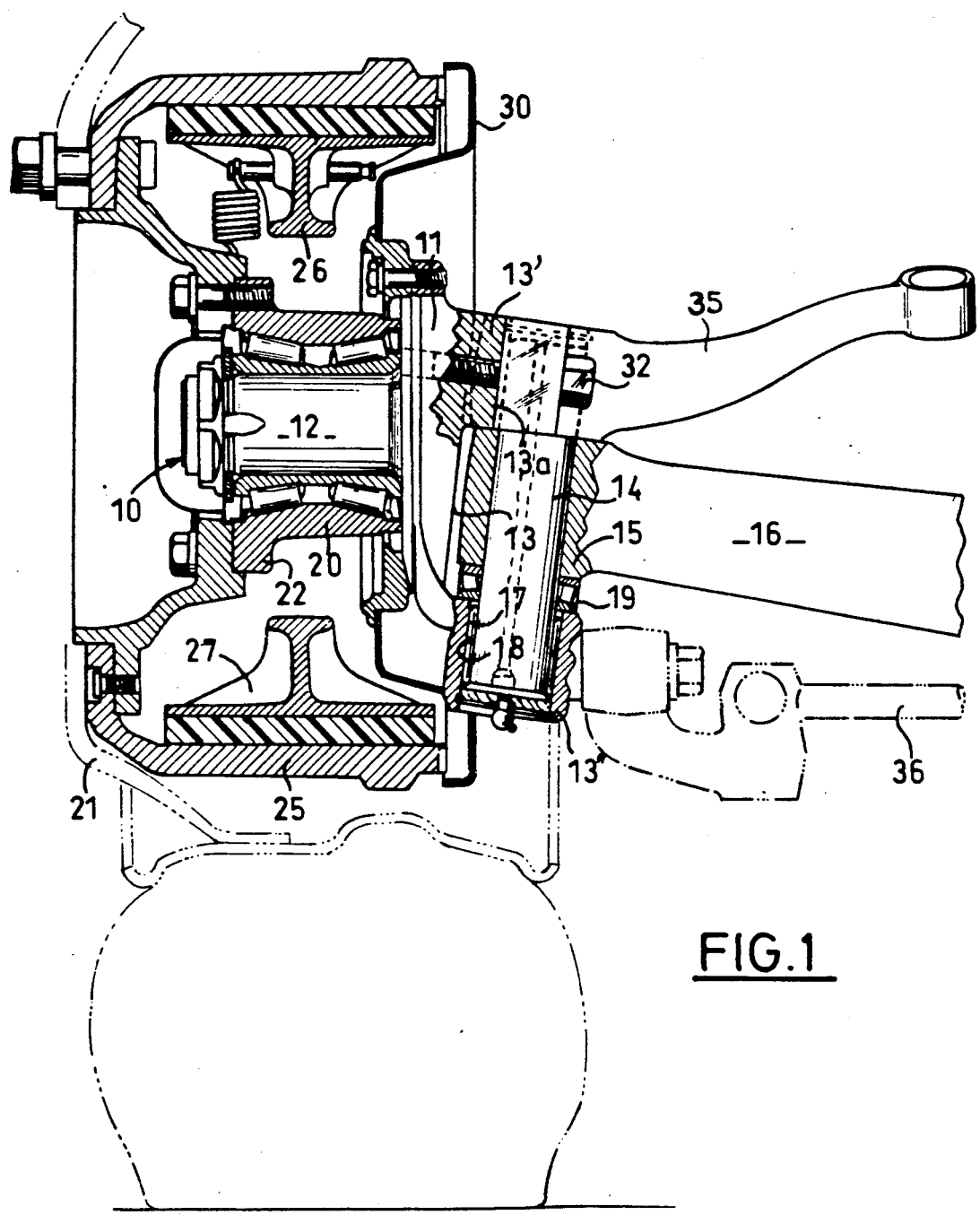
FIG. 1 is a view in axial section of a steerable motor vehicle wheel whose hub is mounted on the shaft of the knuckle according to the invention.
Figure 2:
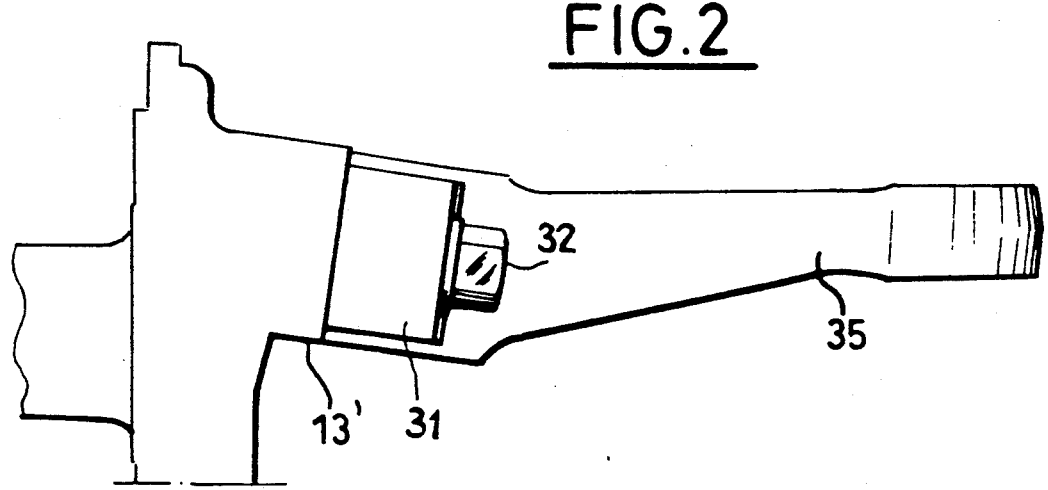
FIG. 2 is a view in elevation of the upper portion of the knuckle of FIG. 1.
Figure 3:
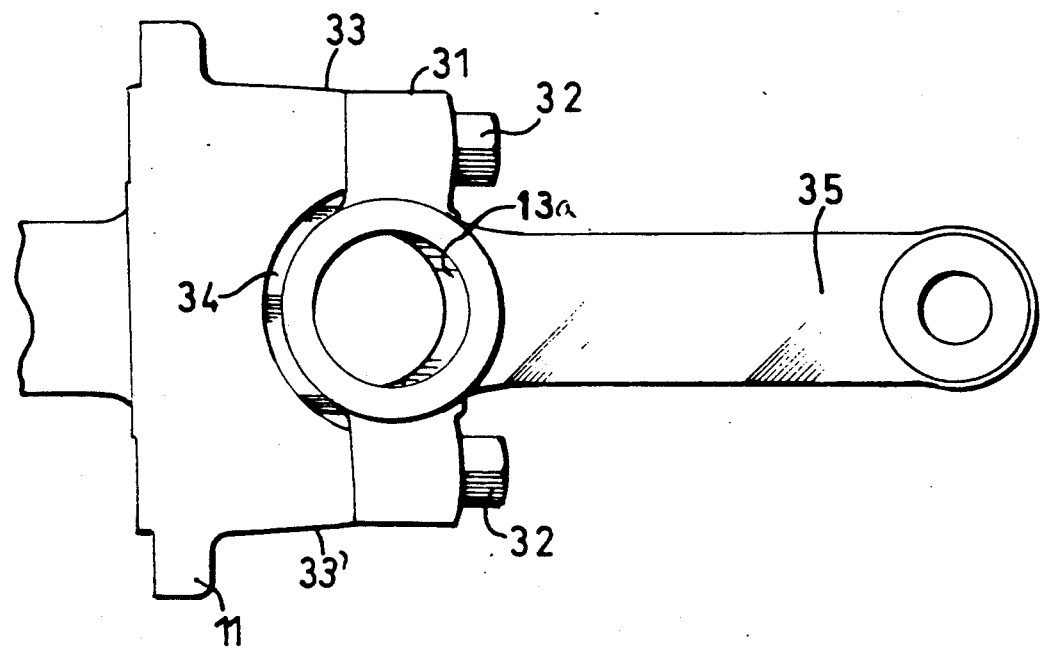
FIG. 3 is a plan view of the portion of the knuckle of FIG. 2.

In the embodiment of FIGS. 1-3, the invention is applied to the mounting of a steerable vehicle wheel in which the knuckle consists of a body 11 from which a knuckle shaft 12 extends outward, and from which extends inward (i.e., toward the longitudinal center line of the vehicle) upper leg 13' and lower leg 13" of a yoke 13 through which passes a greased pivot pin 14.

According to a known arrangement, pin 14 is force-fitted into the bore of a head 15 of axle 16 which fits between legs 13', 13" of the yoke.

The upper end of pin 14 is mounted with play in an antifriction ring 13a mounted in the bore of leg 13'. The lower end of pin 14 which communicates with the upper end by a grease duct fed by a single grease fitting, is mounted with play in contact with roller needles 17 mounted in bore 18 of leg 13". The upper face of leg 13" carries a thrust bearing 19 on which head 15 of axle 16 rests.

Knuckle shaft 12 carries roller bearing 20 of wheel 21. A flange 22 formed at the outside ring of roller bearing 20 supports jointly the rim of wheel 21 and drum 25 of a brake having shoes 26 and 27.

Body 11 of the knuckle also carries a protective deflector 30 of brake 26.

Referring more particularly to FIGS. 2 and 3, upper leg 13' of yoke 13 consists of two parts. A part including the pin 12 has two bosses 33 and 33' on either side of a recess 34. The other part comprises a fastening flange 31 formed unitarily with steering lever 35. The ring 13a which supports the upper end of pin 14 fits in the bore in this fastening flange 31. Bolts 32 clamp flange 31 to bosses 33 and 33' such that a projecting portion of the flange around ring 13a fits in recess 34.

The orientation control of the knuckle around pivot pin 14 is provided by the steering lever 35 which extends from flange 31 of upper leg 13'. Lower leg 13" is connected to a lever and to a tie rod 36 which provides the crosswise connection of the knuckles of the steering axle.

The removal of bolts 32 thus makes it possible to free the pivot pin 14 from the knuckle, after raising the suspended part of the vehicle, particularly at the point of axle head 15. This is due to the fact that the wheel is no longer clamped to the flange 31.

The suspension of the wheel in this case is slackened, which facilitates the removal of the wheel and the freeing of lower leg 13" from the pivot pin. This facilitates access to ring 13a, to needles 17 and to thrust bearing 19.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle steering knuckle comprising:
   a body;
   a knuckle shaft for supporting a wheel and extending from said body; and a yoke having upper and lower legs extending from said body in a direction opposite said knuckle shaft, wherein said upper leg of said yoke comprises:
a) a fastening flange separate from said body, said fastening flange including a bore formed entirely in said fastening flange and through which a pivot pin can pass, and a steering lever extending from said fastening flange, and
b) means for releasably fastening said fastening flange to said body, whereby a head end of an axle can fit between said upper and lower legs and a pivot pin can be inserted through said yoke and the axle to form a knuckle joint, and whereby said fastening flange may be released from said body to gain access to said knuckle joint.

2. The steering knuckle of claim 1, wherein said fastening means comprise bolts.

3. The steering knuckle of claim 1, wherein said body comprises two support bosses separated by a recess and wherein said fastening flange fits into said recess.

4. The steering knuckle of claim 3, wherein said fastening means comprise bolts.

5. The steering knuckle of claim 4, wherein said bolts are threaded into said support bosses.

* * * * *